US008446851B2

(12) United States Patent
Gou

(10) Patent No.: US 8,446,851 B2
(45) Date of Patent: May 21, 2013

(54) METHOD AND DEVICE FOR TRANSMITTING A MULTIMEDIA BROADCAST MULTICAST SERVICE

(75) Inventor: Wei Gou, Guangdong Province (CN)

(73) Assignee: ZTE Incorporation, Shenzhen, Guangdong Province (CN)

( * ) Notice: Subject to any disclaimer, the term of this patent is extended or adjusted under 35 U.S.C. 154(b) by 278 days.

(21) Appl. No.: 12/918,592

(22) PCT Filed: Dec. 17, 2008

(86) PCT No.: PCT/CN2008/073567
§ 371 (c)(1),
(2), (4) Date: Aug. 20, 2010

(87) PCT Pub. No.: WO2009/103213
PCT Pub. Date: Aug. 27, 2009

(65) Prior Publication Data
US 2011/0032861 A1    Feb. 10, 2011

(30) Foreign Application Priority Data

Feb. 21, 2008   (CN) .......................... 2008 1 0006192

(51) Int. Cl.
*H04H 20/71*         (2008.01)
(52) U.S. Cl.
USPC ............ 370/312; 370/315; 370/328; 370/341
(58) Field of Classification Search
USPC ................. 370/312, 315, 328, 341; 455/434, 455/450, 507, 454
See application file for complete search history.

(56) References Cited

U.S. PATENT DOCUMENTS

| 7,746,822 B2* | 6/2010 | Xue et al. ...................... 370/328 |
| 7,974,240 B2* | 7/2011 | Liu et al. ....................... 370/329 |
| 2003/0124976 A1* | 7/2003 | Tamaki et al. .................. 455/15 |
| 2007/0217353 A1 | 9/2007 | Asa et al. |
| 2007/0264932 A1* | 11/2007 | Suh et al. ..................... 455/13.1 |
| 2008/0025280 A1 | 1/2008 | Hsu et al. |
| 2008/0043815 A1* | 2/2008 | Hart et al. ...................... 375/135 |
| 2008/0247372 A1* | 10/2008 | Chion et al. ................... 370/338 |
| 2009/0086666 A1* | 4/2009 | Guvenc et al. ................. 370/328 |

FOREIGN PATENT DOCUMENTS

| CN | 101009512 A | 8/2007 |
| CN | 101043417 A | 9/2007 |

OTHER PUBLICATIONS

P.R. China, State Intellectual Property Office, International Search Report for International Application No. PCT/CN2008/073567, mailed Mar. 26, 2009.

* cited by examiner

*Primary Examiner* — Ricky Ngo
*Assistant Examiner* — Rasheed Gidado
(74) *Attorney, Agent, or Firm* — Bright IP Law Offices

(57) ABSTRACT

A method and a device for transmitting a multimedia broadcast multicast service are provided. The method includes one or more base stations encode and modulate the original multimedia broadcast multicast service data to be transmitted, and transmit the encoded and modulated multimedia broadcast multicast service data to one or more transparent relay stations belonging to the one or more base stations via a specified same time and frequency resource; the one or more transparent relay stations performs a relay process for the received multimedia broadcast multicast service data; then the one or more transparent relay stations and the one or more base stations transmit the multimedia broadcast multicast service data via the specified same time frequency resource simultaneously; and a terminal processes the received multimedia broadcast multicast service data to acquire the original multimedia broadcast multicast service data. The present invention can improve the MBMS service transmission performance in the next generation mobile communication system.

12 Claims, 5 Drawing Sheets

METHOD AND DEVICE FOR TRANSMITTING A MULTIMEDIA BROADCAST MULTICAST SERVICE

FIELD OF THE INVENTION

The present invention relates to mobile communication fields, and in particularly to a method and a device for transmitting a multimedia broadcast multicast service via a transparent relay station (referred to as RS).

BACKGROUND OF THE INVENTION

Along with the popularization of the big-screen multifunctional mobile terminal, the mobile data service is applied more and more widely; the demands for mobile communication are not limited to telephone, message and mobile terminal web browsing service. Since the fast development of the Internet, there emerges a large number of multimedia services. Various kinds of high-bandwidth multimedia services such as video conference, television broadcast, video on demand, advertisement, web education and interactive game are ceaselessly emerging, which satisfies the ever increasing service demand of mobile users on the one hand, and brings a new service growth point to the mobile operators at the same time. Such mobile multimedia services require the multiple users to receive the same data simultaneously, compared with the ordinary data services, the mobile multimedia services are featured with large data quantity, long time duration, and high sensitivity of time delay.

To utilize the mobile network resources effectively, the $3^{rd}$ generation partnership project (referred to as 3GPP) proposed the multimedia broadcast multicast service (referred to as MBMS); a point-to-multipoint service is provided for a data source to transmit data to multiple users in the mobile network, so as to realize network resource sharing, and improve the utilization ratio of network resources (especially the valuable air interface resources). The MBMS is a technique for transferring data from one source to multiple destinations by sharing the network resources. The MBMS defined by the 3GPP can implement not only the low speed message type multicast and broadcast for the plain text, but also the multicast and broadcast of the high speed multimedia service, and provide a plenty and variety of video, audio and multimedia services; therefore, the MBMS has become a trend of development, and provides a better business prospects for the development of the 3G and the 4G.

There are two kinds of RSs currently under discussion; one is a transparent RS, the other one is a nontransparent RS; these two kinds of RSs are hereinafter described in detail.

The transparent RS: in the transparent relay mode, the RS and the user terminals (referred to as UTs) are all located within the range covered by the multihop relay base station (referred to as MR-BS), at the same time, the UTs are also located within the range covered by the RS. The downlink control information and the data service are transmitted independently, wherein, the downlink control information is directly transmitted from the MR-BS to the UTs without passing through any RS, while the data service is transmitted to the UTs via an RS. The RS does not transmit its information such as synchronization information, system configuration information and resource allocation information in the downlink broadcast channel. All the RSs and UTs belonging to the same MR-BS cell achieve the synchronization with the MR-BS via the synchronization channel (referred to as SCH) of the MR-BS. In the transparent relay mode, the UT is unaware of the existence of the RS (although there is communication between the UT and the RS). The transparent relay RS is mainly used for improving the system capacity and the throughout of individual user, and it only supports the centralized scheduling especially in the urban areas, the transparent RS and the nontransparent RS can coexist in a multihop relay cell (referred to as MR-cell).

The nontransparent RS: in the nontransparent relay mode, the RS is located within the range covered by the MR-BS while the UT is located outside of the range covered by the MR-BS, the UT, however, is located within the range covered by the RS. The downlink control information and the data service must be both transmitted to the UT via the RS. The RS transmits its synchronization information, system configuration information, resource allocation information and so on in the downlink broadcast channel. In the nontransparent relay mode, the UT can detect the existence of the RS. The nontransparent relay RS is mainly used for improving the coverage of the system, and it can support the centralized scheduling and also can support the distributed scheduling especially in the suburban areas. In an MR-cell, the transparent RS and the nontransparent RS can coexist.

To sum up, the transmission of the MBMS service with the participation of the transparent RS in the next-generation communication system has not been realized at present.

SUMMARY OF THE INVENTION

The technical problem to be solved by the present invention is that, in the next generation mobile communication system based on the orthogonal frequency division multiplexing (referred to as OFDM) multiple access technology, there is not a method for transmitting and receiving a MBMS service in the case that there is a transparent RS, thus it is impossible to transmit and receive a MBMS service and it is impossible to provide a gain for a UE receiving a MBMS service. To this end, the main objective of the present invention is to provide an improved MBMS service data transmitting scheme with a transparent RS to solve the above problem.

To achieve the above objectives, according to one aspect of the present invention, a method for transmitting a multimedia broadcast multicast service is provided.

The method for transmitting a multimedia broadcast multicast service according to the present invention includes the following steps: step one: one or more base stations encode and modulate the original multimedia broadcast multicast service data to be transmitted, and transmit the encoded and modulated multimedia broadcast multicast service data to one or more transparent relay stations belonging to the one or more base stations via a specified same time and frequency resource; step two: the one or more transparent relay stations perform a relay process for the received multimedia broadcast multicast service data, so as to guarantee that the format of the data transmitted by the one or more transparent relays is identical to that of the multimedia broadcast multicast service data transmitted by the one or more base stations; step three: after the one or more transparent relay stations performing the relay process for the multimedia broadcast multicast service data, the one or more transparent relay stations and the one or more base stations transmit the multimedia broadcast multicast service data via the specified same time and frequency resource simultaneously; and step four: a terminal receives the multimedia broadcast multicast service data, and processes the received multimedia broadcast multicast service data to acquire the original multimedia broadcast multicast service data.

Wherein, the step one further includes the following steps: the one or more transparent relay stations receive the multimedia broadcast multicast data from the one or more base stations via the specified same time and frequency resource.

Specifically, the terminal performs the following processes to the received multimedia broadcast multicast service data: performs an inverse orthogonal frequency division multiplexing operation, a channel estimation, a detecting process to obtain the constellation symbol level data of the estimated multimedia broadcast multicast service data service, and demodulates and decodes the symbol level data of the estimated multimedia broadcast multicast service data service.

Wherein, the step two further includes the following steps: the one or more base stations are in a waiting state when the one or more transparent relay stations process the multimedia broadcast multicast data received from the one or more base stations.

Wherein, the step three further includes: the one or more base stations determines a waiting time according to a relay processing time pre-estimated by the one or more transparent relay stations; and the one or more transparent relay stations and the one or more base stations transmit the multimedia broadcast multicast service data via the specified same time and frequency resource simultaneously when the waiting time is over.

Wherein the step three further includes the following steps: after the relay process is over, the one or more transparent relay stations notify the one or more base stations that the relay process is over; and the one or more transparent relay stations and the one or more base stations transmit the multimedia broadcast multicast service data via the specified same time and frequency resource simultaneously.

Wherein, the step three further includes the following steps: after transmitting the multimedia broadcast multicast service data to the one or more transparent relay stations, the one or more base stations waiting a predefined time; after the predefined time is over, the one or more transparent relay stations and the one or more base stations transmit the multimedia broadcast multicast service data via the specified same time and frequency resource simultaneously, the predefined time is greater than or equal to a maximal relay processing time.

In the above method, the transparent relay station includes: a decoding forwarding relay station and a coding and cooperating relay station.

To achieve the above objectives, according to another aspect of the present invention, a device for transmitting a multimedia broadcast multicast service is provided.

The device for transmitting a multimedia broadcast multicast service according to the present invention includes: a modulating module, adapted to encode and modulate the original multimedia broadcast multicast service data to be transmitted; a first transmitting module, adapted to transmit the multimedia broadcast multicast service data encoded and modulated by the modulating module via a specified same time and frequency resource; a first receiving module, adapted to receive the multimedia broadcast multicast service data transmitted by the first transmitting module; a first processing module, adapted to perform a relay process for the multimedia broadcast multicast service data received by the first receiving module, so as to guarantee that the format of the data transmitted by the one or more transparent relay stations is identical to that of the multimedia broadcast multicast service data transmitted by the one or more base stations; a second transmitting module, adapted to transmit the multimedia broadcast multicast service data processed by the first processing module simultaneously via the specified same time and frequency resource; a second receiving module, adapted to receive the multimedia broadcast multicast service data transmitted by the second transmitting module; a second processing module, adapted to process the multimedia broadcast multicast service data received by the second receiving module to acquire the original multimedia broadcast multicast service data.

Through to the method for transmitting a multimedia broadcast multicast service of the present invention, the base station can directly perform the management and control, form a MBMS service area within a small range flexibly, and provide an air interface combination gain to the UE end, which solves the problem that the transmission of the MBMS service with the participation of the transparent RS in the next-generation communication system has not been realized at present, thereby improving the MBMS service transmission performance in the next generation mobile communication system.

Other features and advantages of the present invention will be clarified in the following description, and will be partly obvious from the description, or may be understood by implementing the present invention. The objectives and other advantages of the present invention may be implemented and achieved by the structures indicated particularly in the written description, claims and accompanying drawings.

BRIEF DESCRIPTION OF THE DRAWINGS

The accompanying drawings are used for further illustrating the present invention and constitute a part of the application; the illustrative embodiments of the present invention and the description of the embodiment are used for further explaining the present invention and are not for use in limiting the protection scope thereof. The description of the accompanying drawings is as follows.

DETAILED DESCRIPTION OF THE INVENTION

Function Summary

Taking into account the problem that the transmission of the MBMS service with the participation of the transparent RS in the next-generation communication system has not been realized at present, the embodiments of the present invention provide a scheme for transmitting a multimedia broadcast multicast service in the case that there is a transparent RS, in which one or more base stations encode and modulate the original multimedia broadcast multicast service data to be transmitted, and transmit the encoded and modulated multimedia broadcast multicast service data to one or more transparent relay stations belonging to the one or more base stations via the specified same time and frequency resource; the one or more transparent relay stations perform a relay process for the received multimedia broadcast multicast service data, and then transmit the multimedia broadcast multicast service data via the specified same time and frequency resource together with the one or more base stations simultaneously; and a terminal processes the received multimedia broadcast multicast service data to acquire the original multimedia broadcast multicast service data.

It should be noted that, in the case that there is no conflict, the features described by embodiments of the present invention may be combined with each other. A detailed description of the embodiments in accordance with the present invention is hereinafter provided in detail with reference to the attached drawings.

Method Embodiments

Figure 1:
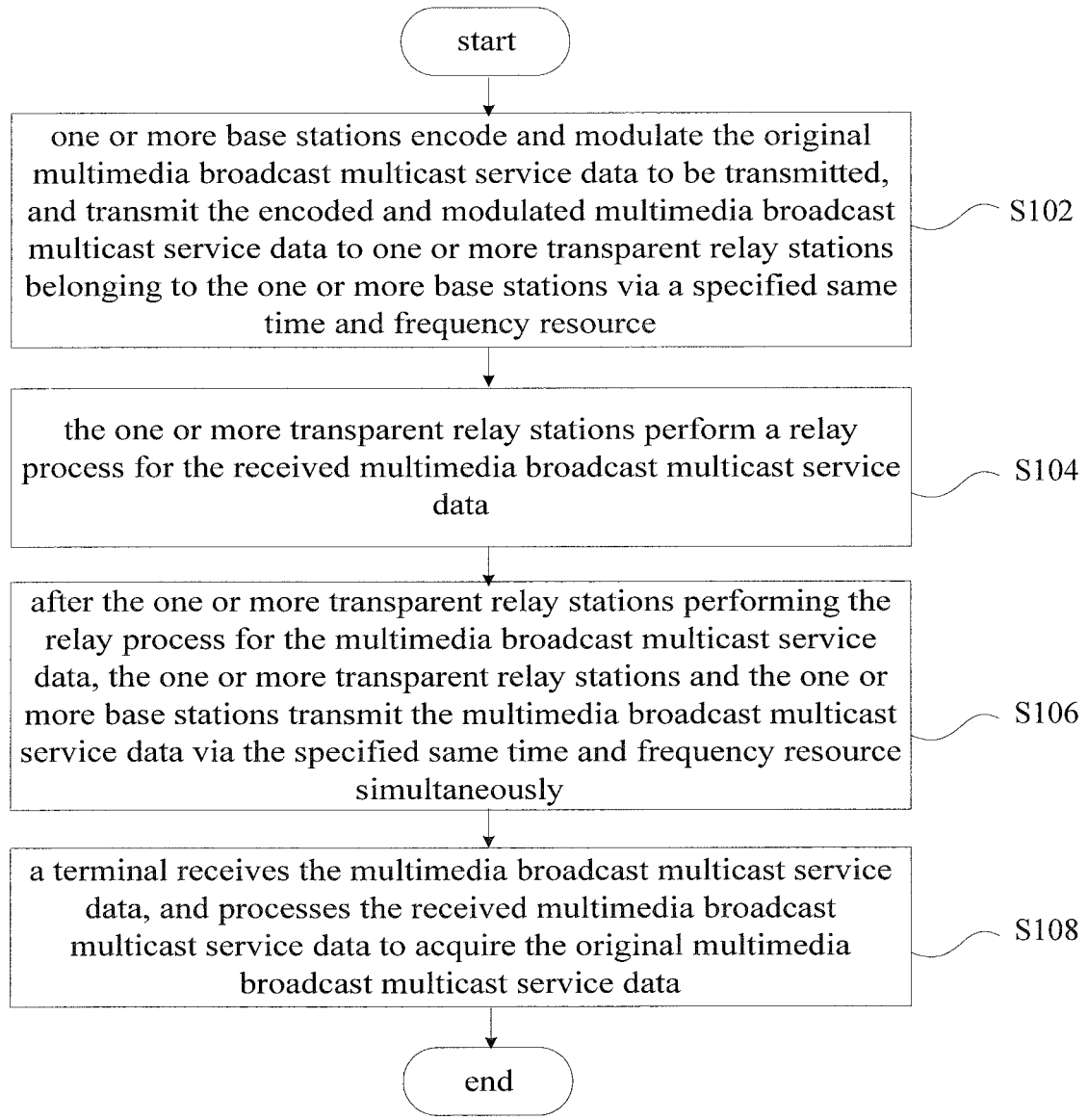
FIG. 1 is a flowchart of the method for transmitting a multimedia broadcast multicast service according to an embodiment of the present invention.

According to an embodiment of the present invention, a method for transmitting a multimedia broadcast multicast service is provided. FIG. 1 is a flowchart of the method for transmitting a multimedia broadcast multicast service according to an embodiment of the present invention; As shown in FIG. 1, the method for transmitting a multimedia broadcast multicast service according to the embodiment of the present invention includes the following steps S102-S108:

Step S102, one or more base stations encode and modulate the original multimedia broadcast multicast service data to be transmitted, and transmit the encoded and modulated multimedia broadcast multicast service data to one or more transparent relay stations belonging to the one or more base stations via a specified same time and frequency resource; the transparent relay station may include: a decoding forwarding relay station and a coding cooperating relay station;

Step S104, the one or more transparent relay stations perform a relay process for the received multimedia broadcast multicast service data, so as to guarantee that the format of data transmitted by the one or more transparent relay stations is identical to that of the multimedia broadcast multicast service data transmitted by the one or more base stations;

Step S106, after the one or more transparent relay stations performing the relay process for the multimedia broadcast multicast service data, the one or more transparent relay stations and the one or more base stations transmit the multimedia broadcast multicast service data via the specified same time and frequency resource simultaneously;

Step S108, a terminal receives the multimedia broadcast multicast service data, and processes the received multimedia broadcast multicast service data to acquire the original multimedia broadcast multicast service data.

Wherein, Step S102 further includes the following steps: the one or more transparent relay stations receive the multimedia broadcast multicast data from the one or more base stations via the specified same time and frequency resource.

Specifically, the terminal performs the following processes to the received multimedia broadcast multicast service data: performs an inverse orthogonal frequency division multiplexing operation, a channel estimation, a detecting process to obtain the symbol level data of the estimated multimedia broadcast multicast service data service, and demodulates and decodes the symbol level data of the estimated multimedia broadcast multicast service data service.

Wherein, Step S104 further includes the following steps: the one or more base stations are in a waiting state when the one or more transparent relay stations process the multimedia broadcast multicast data received from the one or more base stations.

Wherein, Step S106 can further include the following operations:

(1) the one or more base stations determines a waiting time according to a relay processing time pre-estimated by the one or more transparent relay stations; and the one or more transparent relay stations and the one or more base stations transmit the multimedia broadcast multicast service data via the specified same time and frequency resource simultaneously when the waiting time is over.

(2) after the relay process is over, the one or more transparent relay stations notify the one or more base stations that the relay process is over; and the one or more transparent relay stations and the one or more base stations transmit the multimedia broadcast multicast service data via the specified same time and frequency resource simultaneously.

(3) after transmitting the multimedia broadcast multicast service data to the one or more transparent relay stations, the one or more base stations waiting a predefined time; after the predefined time is over, the one or more transparent relay stations and the one or more base stations transmit the multimedia broadcast multicast service data via the specified same time and frequency resource simultaneously; the predefined time is greater than or equal to a maximal relay processing time.

According to the method for transmitting a multimedia broadcast multicast service of the present invention, the base station can directly perform the management and control, form a MBMS service area flexibly within a small range, and provide an air interface combination gain to the UE terminal, which solves the technical problem that the transmission of the MBMS service with the participation of the transparent RS in the next-generation communication system has not been realized at present, thereby improving the MBMS service transmission performance in the next generation mobile communication system.

Figure 2:
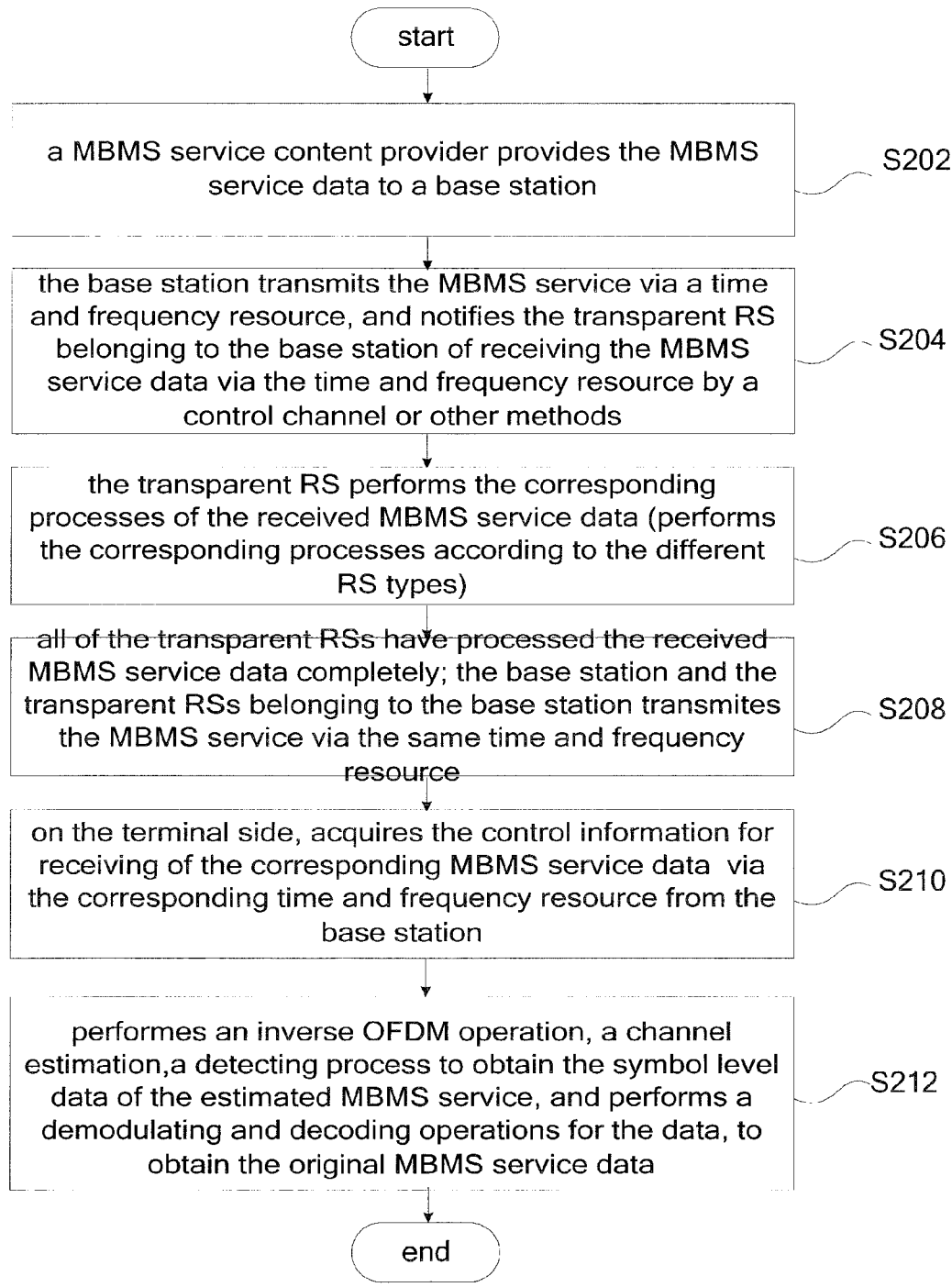
FIG. 2 is a flowchart of the method for transmitting a multimedia broadcast multicast service according to an embodiment of the present invention.

An embodiment of the present invention is hereinafter described with reference to FIG. 2. In the embodiment, a method for transmitting and receiving a multimedia broadcast multicast service in the next generation mobile communication system in the case that there is a transparent RS is provided, the multimedia broadcast multicast service is transmitted and received between the base station side and the user equipment. FIG. 2 is a flowchart of the method for transmitting a multimedia broadcast multicast service according to an embodiment of the present invention. As shown in FIG. 2, the method includes the following steps S202-S212:

Step S202, a MBMS service content provider provides the MBMS service data to a base station;

Step S204, the base station transmits the MBMS service via a time and frequency resource, and notifies the transparent RS belonging to the base station of receiving the MBMS service data via the time and frequency resource by a control channel or other methods (corresponding to step S102 of FIG. 1);

Step S206, the transparent RS performs the corresponding processes of the received MBMS service data (performs the corresponding processes according to the different RS types such as a decoding forwarding relay station and a coding cooperating relay station); at this time, the RS processing requires a certain time period, and thus the base station needs to wait (corresponding to step S104 of FIG. 1);

Step S208, the base station waits for a certain delay, until all of the transparent RSs have processed the received MBMS service data completely; the base station and the transparent RSs belonging to the base station transmits the MBMS service via the same time and frequency resource, and finally it is guaranteed that the air interface data transmitted by the base station and the transparent RSs belonging to the base station are completely identical, i.e., the data transmitted by the base station and the transparent RSs belonging to the base station are completely identical at the same time and frequency resource (corresponding to the step S106 of FIG. 1);

Step S210, on the terminal side, acquires the control information for receiving of the corresponding MBMS service data via the corresponding time and frequency resource from the base station; and Step S212: performs an inverse OFDM operation, a channel estimation, a detecting process to obtain the symbol level data of the estimated MBMS service, and performs demodulating and decoding operations for the data, to obtain the original MBMS service data (corresponding to step S108 of FIG. 1).

Another embodiment of the present invention is hereinafter described with reference to FIG. 3 and FIG. 4.

Figure 3:
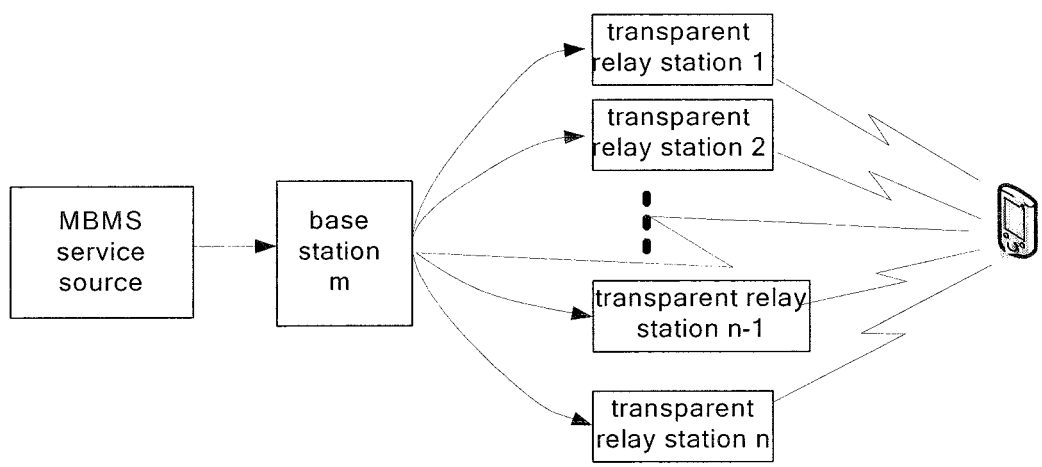
FIG. 3 is a schematic diagram of the process for transmitting multimedia broadcast multicast service data in an individual cell according to another embodiment of the present invention.
Figure 4:
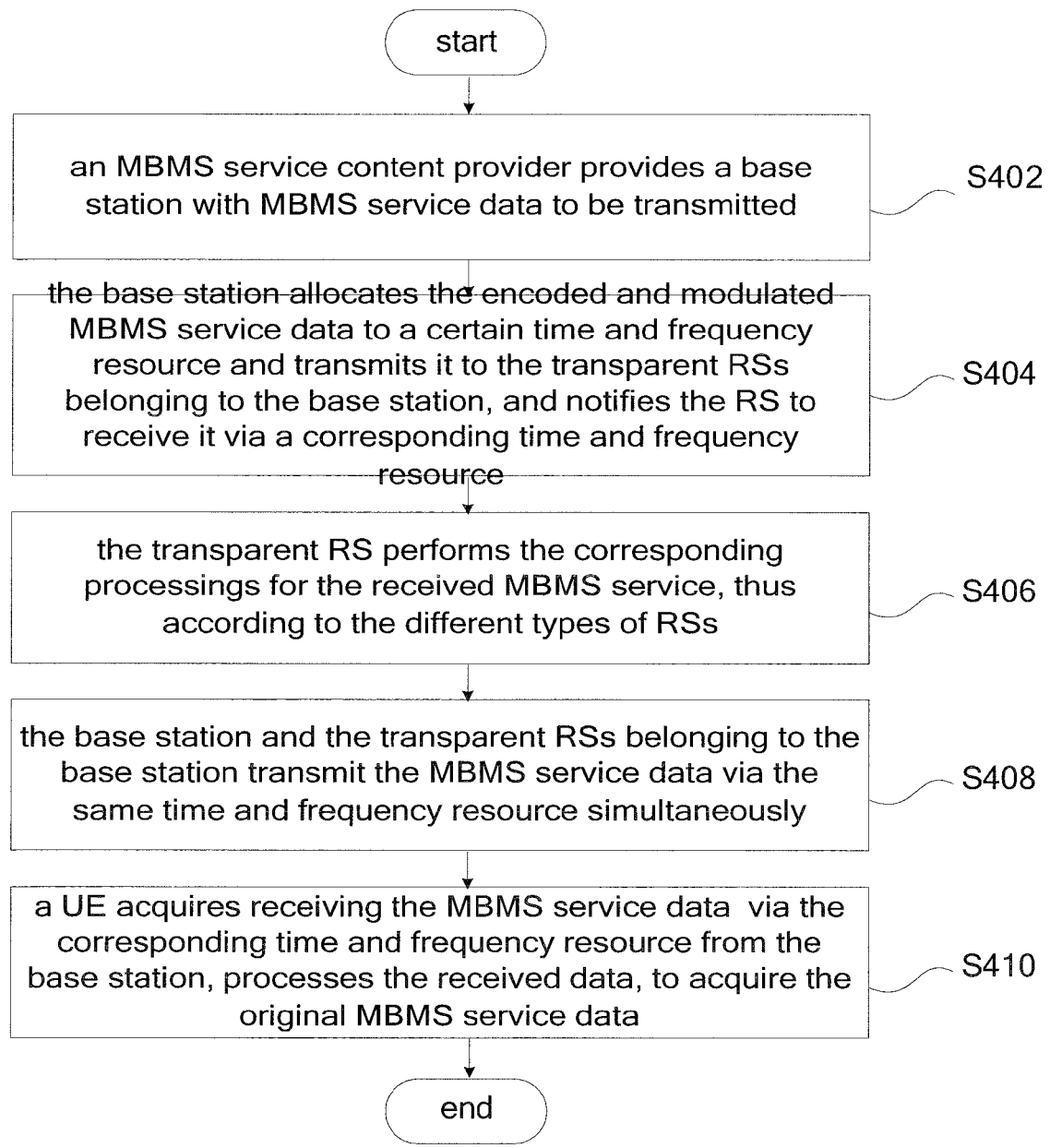
FIG. 4 is a flowchart of the method for transmitting a multimedia broadcast multicast service according to another embodiment of the present invention.

FIG. 3 is a schematic diagram of the process for transmitting MBMS service data in an individual cell according to another embodiment of the present invention. FIG. 4 is a flowchart of the method for transmitting a multimedia broadcast multicast service according to another embodiment of the present invention. The system structure of the embodiment is as shown in FIG. 3. The detailed implementing process of the embodiment is shown in FIG. 4, including the following steps S402-S410: Step S402: an MBMS service content provider provides a base station with MBMS service data to be transmitted;

Step S404: after encoding and modulating the MBMS service data, the base station allocates the encoded and modulated MBMS service data to a certain time and frequency resource and transmits it to the transparent RSs belonging to the base station, and notifies the RS to receive it via a corresponding time and frequency resource (corresponding to step S102 of FIG. 1);

Step S406: the transparent RS performs the corresponding process for the received MBMS service, the processing procedures are different according to the different types of RSs, for example, the RS including a decoding forwarding relay station and a coding cooperating relay station (corresponding to step S104 of FIG. 1);

Step S408: after the transparent RSs belonging to the base station processing the received data completely, the base station and the transparent RSs belonging to the base station transmit the MBMS service data via the same time and frequency resource simultaneously, the objective of the above processing is to guarantee that the air interface data transmitted by the base station and the transparent RSs are completely identical at the same time, and thus in-air radio-combination can be used, wherein, since the carriers of the same MBMS service data from the base station and the transparent RSs belonging to the base station are completely identical, such carriers can be directly radio-combined in the air (corresponding to step S106 of FIG. 1);

Step S410: at the receiving end, a UE acquires receiving the MBMS service data via the corresponding time and frequency resource from the base station, and performs an inverse OFDM operation and a channel estimation of the received data, a detecting process to obtain the symbol level data of the estimated MBMS service, and performs demodulating and decoding operations for the data, to obtain the original MBMS service data (corresponding to the step S108 of FIG. 1).

According to the method for transmitting a multimedia broadcast multicast service of the present invention, the base station can directly perform the management and control, form a MBMS service area within a small range flexibly, and provide an air interface combination gain to the UE terminal, thereby improving the MBMS service transmission performance in the next generation mobile communication system.

Device Embodiment

Figure 5:
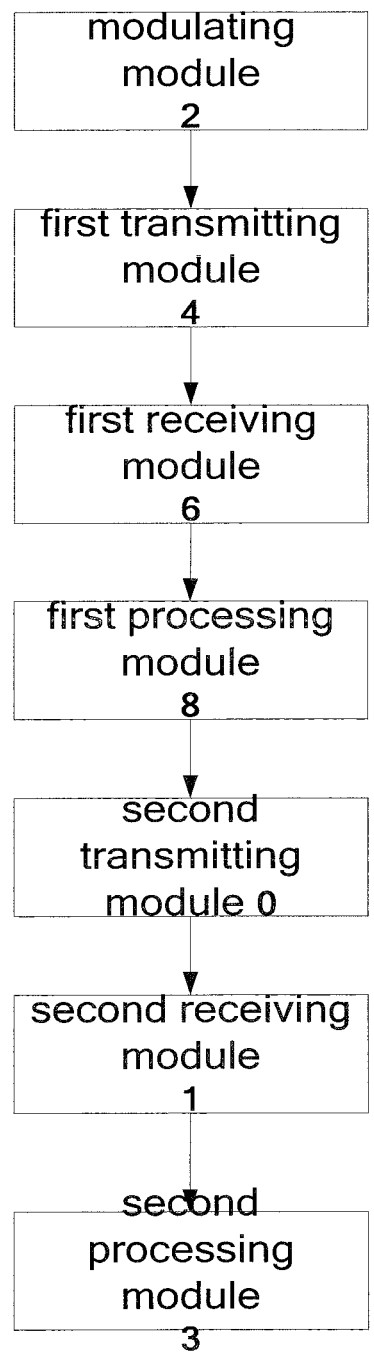
FIG. 5 is a block diagram of the device for transmitting a multimedia broadcast multicast service according to an embodiment of the present invention.

According to an embodiment of the present invention, a device for transmitting a multimedia broadcast multicast service is provided. The device is used for implementing the method for transmitting a multimedia broadcast multicast service of the above method embodiment. FIG. 5 is a block diagram of the device for transmitting a multimedia broadcast multicast service according to an embodiment of the present invention. As shown in FIG. 5, the device includes: a modulating module 2, a first transmitting module 4, a first receiving module 6, a first processing module 8, a second transmitting module 0, a second receiving module 1 and a second processing module 3; the above structure is hereinafter described in detail.

The modulating module 2, adapted to encode and modulate the original multimedia broadcast multicast service data to be transmitted; the first transmitting module 4 connected to the modulating module 2, and is adapted to transmit the multimedia broadcast multicast service data encoded and modulated by the modulating module 2 via a specified same time and frequency resource. The above two modules may be set in one or more base stations.

The first receiving module 6, connected to the first transmitting module 4, is adapted to receive the multimedia broadcast multicast service data transmitted by the first transmitting module 4; the first processing module 8, connected to the first receiving module 6, is adapted to perform a relay process for the multimedia broadcast multicast service data received by the first receiving module 6, so as to guarantee that the format of the data transmitted by the one or more transparent relay stations is identical to that of the multimedia broadcast multicast service data transmitted by the one or more base stations; the second transmitting module 0, connected to the first processing module 8, is adapted to transmit the multimedia broadcast and multicast service data processed by the first processing module 8 simultaneously via the specified same time and frequency resource. The above three modules may be set in one or more transparent stations.

The second receiving module 1, connected to the second transmitting module 0, is adapted to receive the multimedia broadcast multicast service data transmitted by the second transmitting module 0; the second processing module 3, connected to the second receiving module 1, is adapted to process the multimedia broadcast multicast service data received by the second receiving module 1, to acquire the original multimedia broadcast multicast service data. The above two modules may be set in the terminal.

To sum up, according to the method for transmitting a multimedia broadcast multicast service of the present invention, the base station can directly perform the management and control, form a MBMS service area within a small range flexibly, and provide an air interface combination gain to the UE terminal, which solves the technical problem that the transmission of the MBMS service with the participation of the transparent RS in the next-generation communication system has not been realized at present, thereby improving the MBMS service transmission performance in the next generation mobile communication system.

Obviously, it should be understood by those skilled in the art that, the above various modules or steps of the present invention may be implemented by use of a universal computing device; they may be centralized at a single computing device or distributed at the network composed of multiple computing devices; alternatively, they may be implemented by an executable program code of computing device, therefore which may be stored in a storage device and executed by a computing device, or which may be respectively formed as various integrated circuit modules, or multiple modules or steps of which may be formed as single integrated circuit module. Therefore, the present invention is not limited to any specific combination of hardware and software.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

The invention claimed is:

1. A method for transmitting a multimedia broadcast multicast service, comprising the following steps:

step one, encoding and modulating, by one or more base stations, original multimedia broadcast multicast service data to be transmitted, and transmitting, by one or more base stations, the encoded and modulated multimedia broadcast multicast service data to one or more transparent relay stations belonging to the one of more base stations via a specified same time and frequency resource;

step two, performing, by the one or more transparent relay stations, a relay process for the received multimedia broadcast multicast service data, so as to guarantee that the format of data transmitted by the one or more transparent relay stations is identical to that of the multimedia broadcast multicast service data transmitted by the one or more base stations;

step three, after performing the relay process for the multimedia broadcast multicast service data by the one or more transparent relay stations, transmitting, by the one or more transparent relay stations and the one or more base stations, the multimedia broadcast multicast service data via the specified same time and frequency resource simultaneously; and step four, receiving, by a terminal, the multimedia broadcast multicast service data, and processing, by the terminal, the received multimedia broadcast multicast service data to acquire the original multimedia broadcast multicast service data;

wherein the step one further comprises the following steps: receiving, by the one or more transparent relay stations, the multimedia broadcast multicast data from the one or more base stations via the specified same time and frequency resource;

wherein the terminal performs the following processes to the received multimedia broadcast multicast service data: performing an inverse orthogonal frequency division multiplexing operation, a channel estimation, a detecting process to obtain a constellation symbol level data of the estimated multimedia broadcast multicast service data, and demodulating and decoding the symbol level data of the estimated multimedia broadcast multicast service data.

2. The method according to claim 1, wherein the step two further comprises the following steps: the one or more base stations are in a waiting state when the one or more transparent relay stations process the multimedia broadcast multicast data received from the one or more base stations.

3. The method according to claim 2, wherein the step three further comprises the following steps:

determining, by the one or more base stations, a waiting time according to a relay processing time pre-estimated by the one or more transparent relay stations; and transmitting, by the one or more transparent relay stations and the one or more base stations, the multimedia broadcast multicast service data via the specified same time and frequency resource simultaneously when the waiting time is over.

4. The method according to claim 2, wherein the step three further comprises the following steps:

after the relay process is over, notifying, by the one or more transparent relay stations, the one or more base stations that the relay process is over; and transmitting, by the one or more transparent relay stations and the one or more base stations, the multimedia broadcast multicast service data via the specified same time and frequency resource simultaneously.

5. The method according to claim 2, wherein the step three further comprises the following steps:

after transmitting the multimedia broadcast multicast service data to the one or more transparent relay stations by the one or more base stations, waiting for a predefined time by the one or more base stations;

transmitting, by the one or more transparent relay stations and the one or more base stations, the multimedia broadcast multicast service data via the specified same time and frequency resource simultaneously when the predefined time is over.

6. The method according to claim 5, wherein the predefined time is greater than or equal to a maximal relay processing time.

7. The method according to claim 1, wherein the transparent relay station comprises: a decoding forwarding relay station and a coding cooperating relay station.

8. The method according to claim 2, wherein the transparent relay station comprises: a decoding forwarding relay station and a coding cooperating relay station.

9. The method according to claim 3, wherein the transparent relay station comprises: a decoding forwarding relay station and a coding cooperating relay station.

10. The method according to claim 4, wherein the transparent relay station comprises: a decoding forwarding relay station and a coding cooperating relay station.

11. The method according to claim 5, wherein the transparent relay station comprises: a decoding forwarding relay station and a coding cooperating relay station.

12. A device for transmitting a multimedia broadcast multicast service, comprising: a processor configured to execute program units stored on a memory, the program units comprising:

a modulating module for encoding and modulating original multimedia broadcast multicast service data to be transmitted on one or more base stations;

a first transmitting module for transmitting the multimedia broadcast multicast service data encoded and modulated by the modulating module via a specified same time and frequency resource;

a first receiving module for receiving the multimedia broadcast multicast service data transmitted by the first transmitting module via the specified same time and frequency resource;

a first processing module for performing a relay process for the multimedia broadcast multicast service data received by the first receiving module, so as to guarantee that the format of the data transmitted by the one or more transparent relay stations is identical to that of the multimedia broadcast multicast service data transmitted by the one or more base stations;

a second transmitting module for transmitting the multimedia broadcast and multicast service data processed by the first processing module and the multimedia broadcast multicast service data encoded and modulated by the modulating module simultaneously via the specified same time and frequency resource;

a second receiving module for receiving the multimedia broadcast multicast service data transmitted by the second transmitting module;

a second processing module for processing the multimedia broadcast multicast service data received by the second receiving module to acquire the original multimedia broadcast multicast service data, wherein the second processing module is configured to perform the following processes to process the multimedia broadcast multicast service data: performing an inverse orthogonal frequency division multiplexing operation, a channel estimation, a detecting process to obtain a constellation symbol level data of the estimated multimedia broadcast multicast service data, and demodulating and decoding the symbol level data of the estimated multimedia broadcast multicast service data.

* * * * *